(12) United States Patent
Hirano

(10) Patent No.: US 11,515,720 B2
(45) Date of Patent: Nov. 29, 2022

(54) INFORMATION PROCESSING APPARATUS AND CHARGING METHOD THEREFOR

(71) Applicant: CANON KABUSHIKI KAISHA, Tokyo (JP)

(72) Inventor: Yasuhiko Hirano, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 375 days.

(21) Appl. No.: 16/116,205

(22) Filed: Aug. 29, 2018

(65) Prior Publication Data

US 2019/0081500 A1   Mar. 14, 2019

(30) Foreign Application Priority Data

Sep. 8, 2017   (JP) .............................. JP2017-173350

(51) Int. Cl.
*H02J 7/00* (2006.01)
*H04N 1/00* (2006.01)

(52) U.S. Cl.
CPC .......... *H02J 7/0069* (2020.01); *H02J 7/0071* (2020.01); *H04N 1/00891* (2013.01); *H04N 1/00904* (2013.01); *H02J 7/00306* (2020.01)

(58) Field of Classification Search
CPC .......... H02J 7/041; H02J 7/007; H02J 7/0093; H02J 7/0075; H02J 2007/004; H02J 7/0063; H02J 2007/0067; H02J 7/0072; H02J 7/042; H02J 2007/10; H02J 7/125; H02J 7/00712; H02J 7/007188; H02J 7/0069; H02J 7/0071; H02J 7/00711; H02J 7/00306; H04N 1/00891; H04N 1/00904

USPC ................. 320/114, 134, 155, 157, 158, 163
See application file for complete search history.

(56) References Cited

U.S. PATENT DOCUMENTS

| | | | |
|---|---|---|---|
| 5,047,961 A * | 9/1991 | Simonsen | G01R 31/3842 340/636.15 |
| 10,416,753 B1 * | 9/2019 | Lim | G06F 1/3296 |
| 2012/0142372 A1 * | 6/2012 | Rosay | G04R 20/04 455/456.1 |
| 2018/0356869 A1 * | 12/2018 | Kwon | G06F 1/206 |

FOREIGN PATENT DOCUMENTS

| | | | |
|---|---|---|---|
| JP | 2001008376 A | | 1/2001 |
| JP | 2010067030 | * | 3/2010 |
| JP | 2013246714 | * | 12/2013 |
| JP | 2014039445 A | | 2/2014 |
| JP | 2014039445 | * | 2/2017 |
| JP | 2017163686 | * | 9/2017 |
| JP | 2019040697 A | * | 3/2019 |

* cited by examiner

*Primary Examiner* — Edward Tso
*Assistant Examiner* — Aaron Piggush
(74) *Attorney, Agent, or Firm* — Canon U.S.A., Inc. IP Division

(57) ABSTRACT

An information processing apparatus is provided with a real-time clock (RTC), a battery that supplies power to the RTC, a power source unit that charges the battery, a display unit that displays a screen for setting date and time of the RTC, on a basis of an output voltage of the battery, and a control unit that performs control so as to charge the battery on the basis of the setting of the date and time of the RTC via the screen.

20 Claims, 9 Drawing Sheets

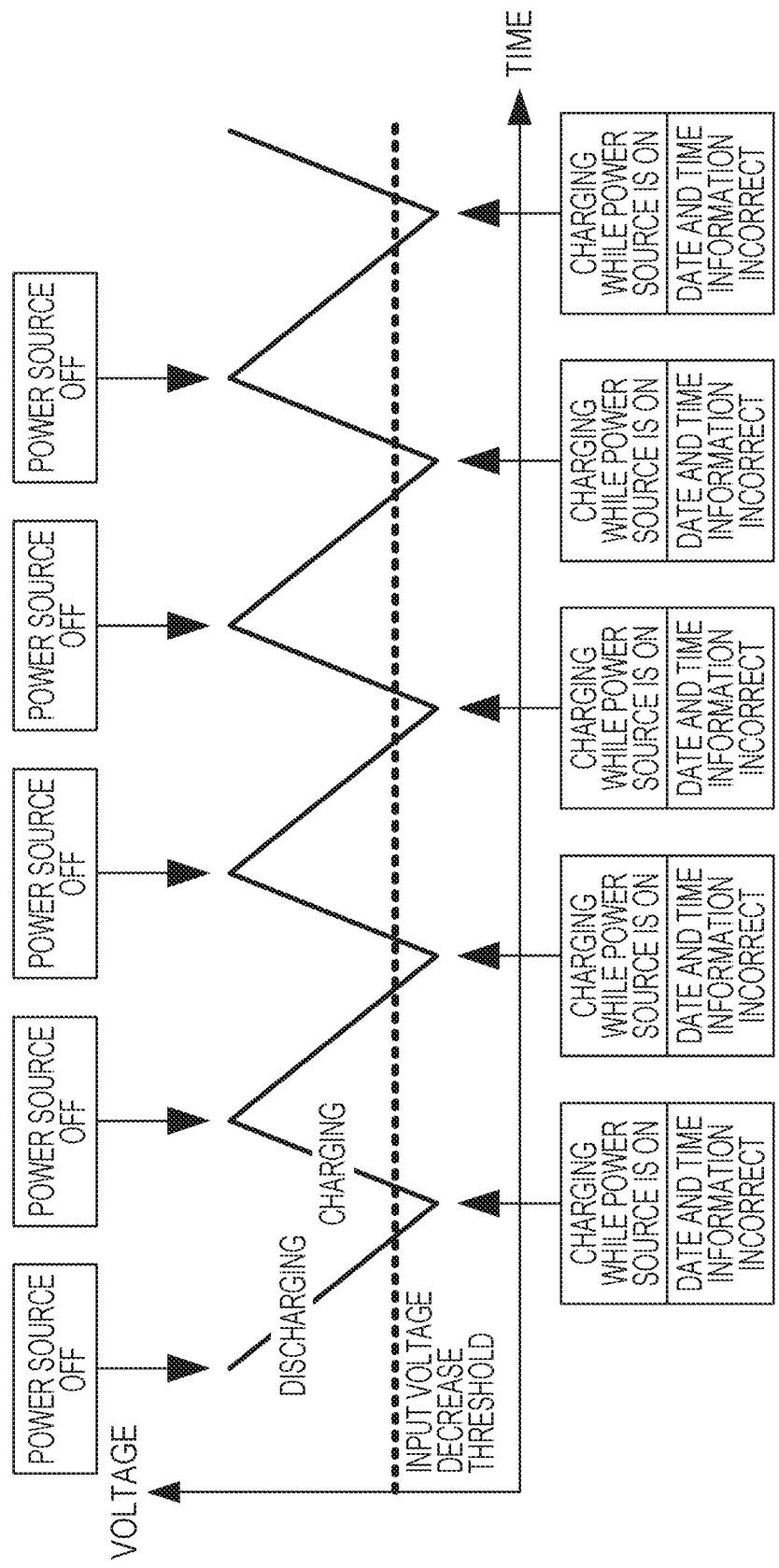

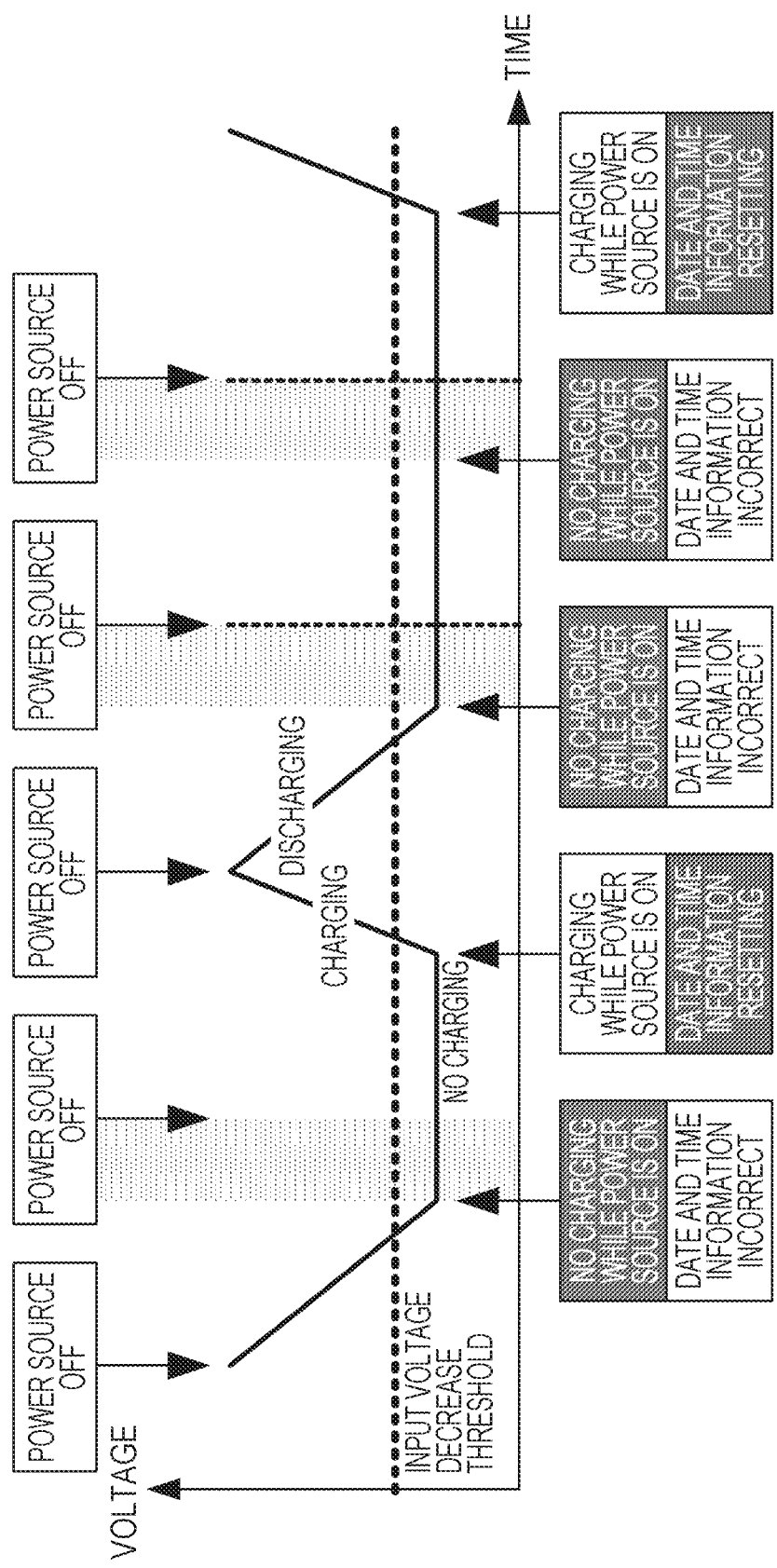

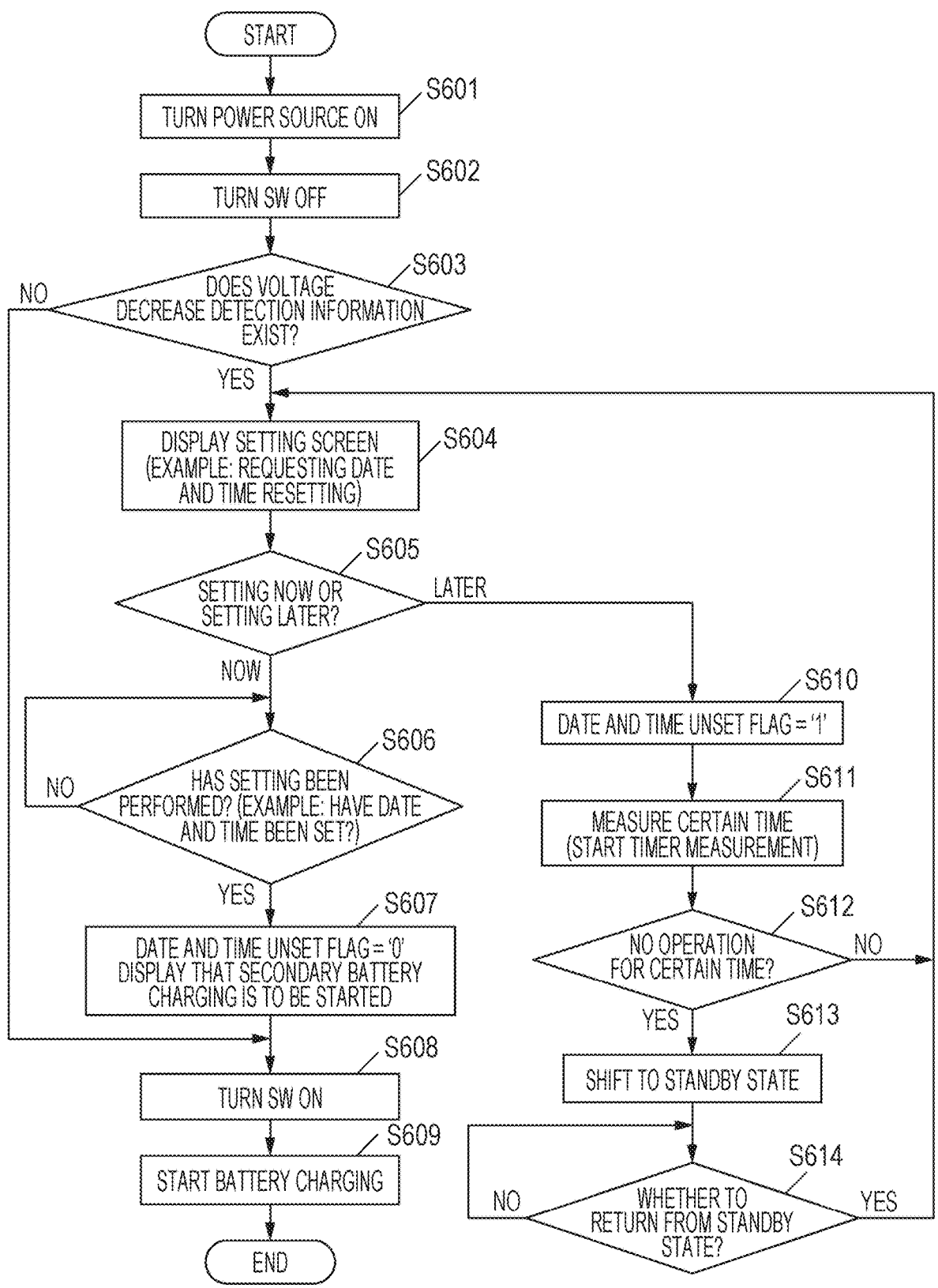

INFORMATION PROCESSING APPARATUS AND CHARGING METHOD THEREFOR

BACKGROUND

Field

The present disclosure relates to an information processing apparatus provided with a clock having date and time information and a secondary battery that can perform charging for backup, and a charging method for the information processing apparatus.

Description of the Related Art

Up to now, an image forming apparatus also functioning as an information processing apparatus uses date and time information for facsimile (FAX) transmission time and writing of data to a universal serial bus (USB) memory. For this reason, the information processing apparatus is provided with a real-time clock (hereinafter, which will be referred to as "RTC") having the date and time information. The information processing apparatus is also provided with a battery for the RTC such that the RTC can hold the date and time information for backup even when a power source of the information processing apparatus is turned OFF.

In recent years, an information processing apparatus that uses a rechargeable secondary battery (battery) has been proposed along with a reduction in a substrate size. In normal circumstances, the secondary battery is charged when the information processing apparatus is in a power source ON state.

Incidentally, since the secondary battery degrades when charging and discharging are repeatedly performed, a charging and discharging cycle life has been developed as an indication of the degradation.

Although the charging and discharging cycle life also relies on a battery capacity of the secondary battery, for example, with regard to a battery having the battery capacity at 5 [mAh], the cycle life is approximately 700 [cycle] with respect to the charging and discharging at a depth of 10% and approximately 25 [cycle] with respect to the charging and discharging at a depth of 100%.

Therefore, in the case of the secondary battery having the small battery capacity, the charging and discharging tends to have a large depth, and countermeasures are needed for avoiding the degradation by taking the charging and discharging cycle life into account.

In this manner, to avoid the degradation of the secondary battery, a technology for setting a charging start time and comparing the charging start time with a current time to control a charging circuit has been proposed (Japanese Patent Laid-Open No. 2001-8376). In addition, a technology for restricting charging in a time period when the charging is desired to be restricted has also been proposed (Japanese Patent Laid-Open No. 2014-39445).

SUMMARY

Since setting of a charging time is performed by obtaining the time information from the RTC in a charging control apparatus described in Japanese Patent Laid-Open No. 2001-8376, in a case where the secondary battery is discharged, the time information of the RTC becomes incorrect, and an issue has arisen that the charging circuit may not be correctly controlled.

In addition, since a battery apparatus and a charging apparatus described in Japanese Patent Laid-Open No. 2014-39445 also read out the time information from the RTC and determine whether or not the current time is a charging restriction time, in a case where the secondary battery is discharged and the time information of the RTC is incorrect, the issue has still arisen that the charging circuit may not be correctly controlled.

Moreover, in a case where the secondary battery is discharged, the charging is started at the next power source ON moment even if the time information of the RTC is not accurate. Therefore, an issue has arisen that the cycle life of the secondary battery may be consumed, that is, the battery degradation may not be avoided.

Various embodiments of the present disclosure seek, among other things, to address the above-described issues. An information processing apparatus according to various embodiments of the present disclosure includes a real-time clock (RTC), a battery that supplies power to the RTC, a power source unit configured to charge the battery, a display unit configured to display a screen for setting of date and time of the RTC on a display, on a basis of an output voltage of the battery, and a control unit configured to perform control to charge the battery on a basis of the setting of the date and time of the RTC via the screen.

Further features will become apparent from the following description of exemplary embodiments with reference to the attached drawings.

BRIEF DESCRIPTION OF THE DRAWINGS

FIGS. 5A and 5B are schematic diagrams for describing a charging and discharging cycle of a secondary battery according to one embodiment of the present disclosure.

FIG. 6 is a flow chart for describing a control according to a second exemplary embodiment of the present disclosure.

DESCRIPTION OF EXEMPLARY EMBODIMENTS

First Exemplary Embodiment

Hereinafter, exemplary embodiments of the present disclosure will be described with reference to the drawings.

Figure 1:
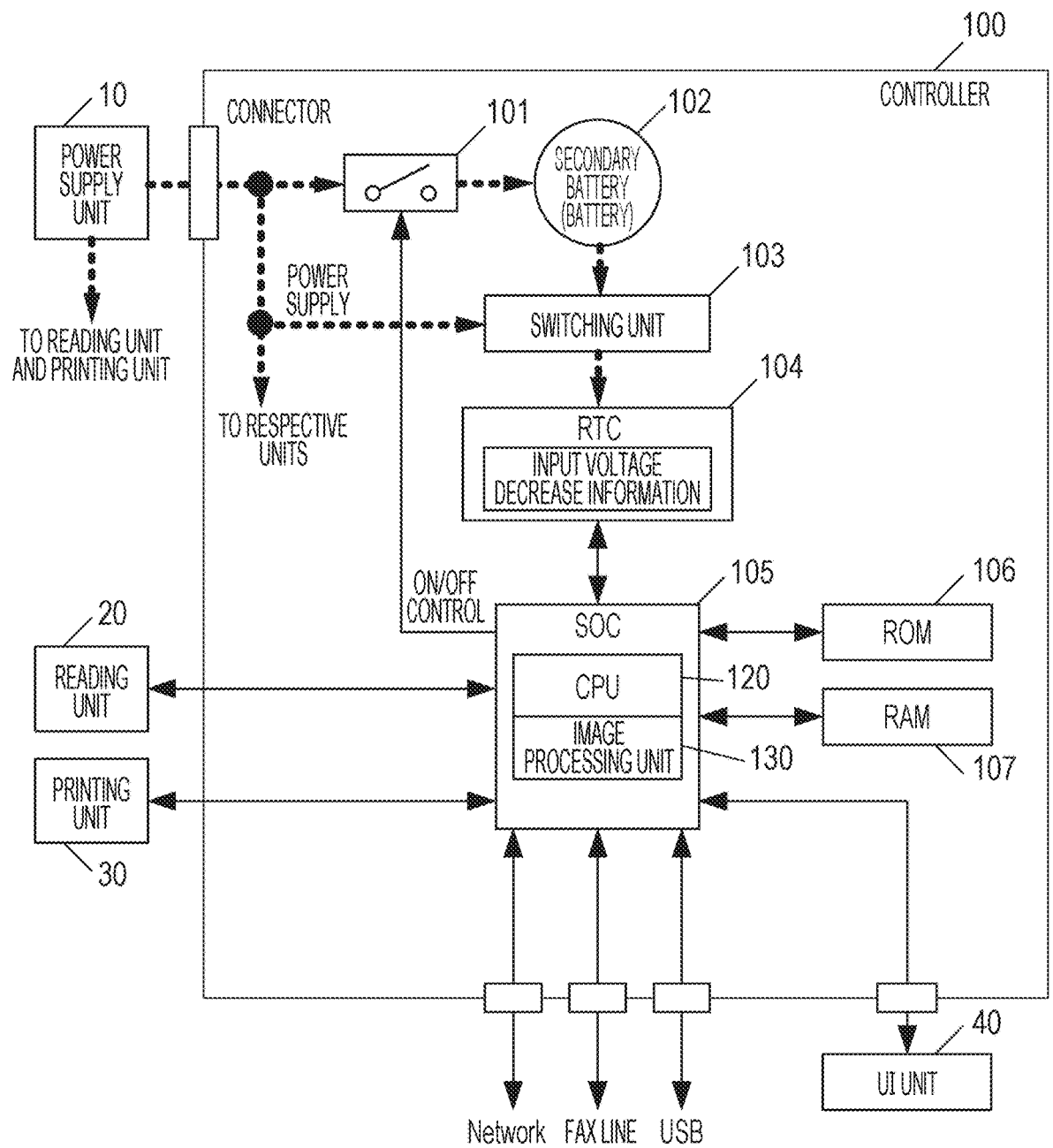
FIG. 1 is a schematic diagram of a hardware configuration of an image forming apparatus according to an exemplary embodiment of the present disclosure.

FIG. 1 illustrates an overview of a hardware configuration of an image forming apparatus.

A power source unit 10 supplies power from an external alternating current (AC) power source to the entirety of the image forming apparatus. The power is also supplied to a controller 100 from the power source unit 10.

A reading unit 20 is configured to read or scan a paper document. The reading unit 20 can consecutively read a plurality of documents by an auto document feeder (ADF) or the like.

A printing unit 30 prints image data read by the reading unit 20 and processed by an image processing unit, image data received by a FAX or the like, image data received from an information processing apparatus connected via a network, and the like on a recording material such as paper.

A user interface unit (hereinafter, which will be referred to as a "UI unit") 40 is a panel that can display information. When a user directly touches a screen or input from a key board, information can be input to the image forming apparatus.

The controller 100 is configured to control the entirety of the image forming apparatus and provided with the following components.

A switch (SW) 101 controls ON and OFF of power supply, and a rechargeable secondary battery (battery) 102 is connected such that the power supplied from the power source unit 10 can be charged via the switch 101.

A switching unit 103 has a function of switching power supply to a RTC 104 between the power supply from the power source unit 10 and the power supply from the secondary battery 102 for backup.

The RTC 104 has date and time information and has a function of detecting that a supplied input voltage is decreased to a predetermined threshold or below and holding this information as input voltage decrease information.

A system on chip (SOC) 105 is provided with a CPU 120 and an image processing unit 130 therein. The SOC 105 is connected to the reading unit 20, the printing unit 30, and the user interface (UI) unit 40 and controls the entirety of the image forming apparatus.

The SOC 105 is connected to a network, a FAX line, or a USB interface and performs data transmission and reception with the internet, a telephone line, or an external memory such as a USB memory.

A ROM 106 stores a control program. The CPU 120 uses a RAM 107 as an area for executing the control program, a work data area for image processing, and a data storage area and executes the control and the image processing.

It should be noted that the CPU 120 executes the control processing in accordance with the control program stored in the ROM 106 and developed into the RAM 107 according to the present exemplary embodiment.

Description on an Operation Overview

First, an operation overview according to the present exemplary embodiment will be described.

Figure 2A:
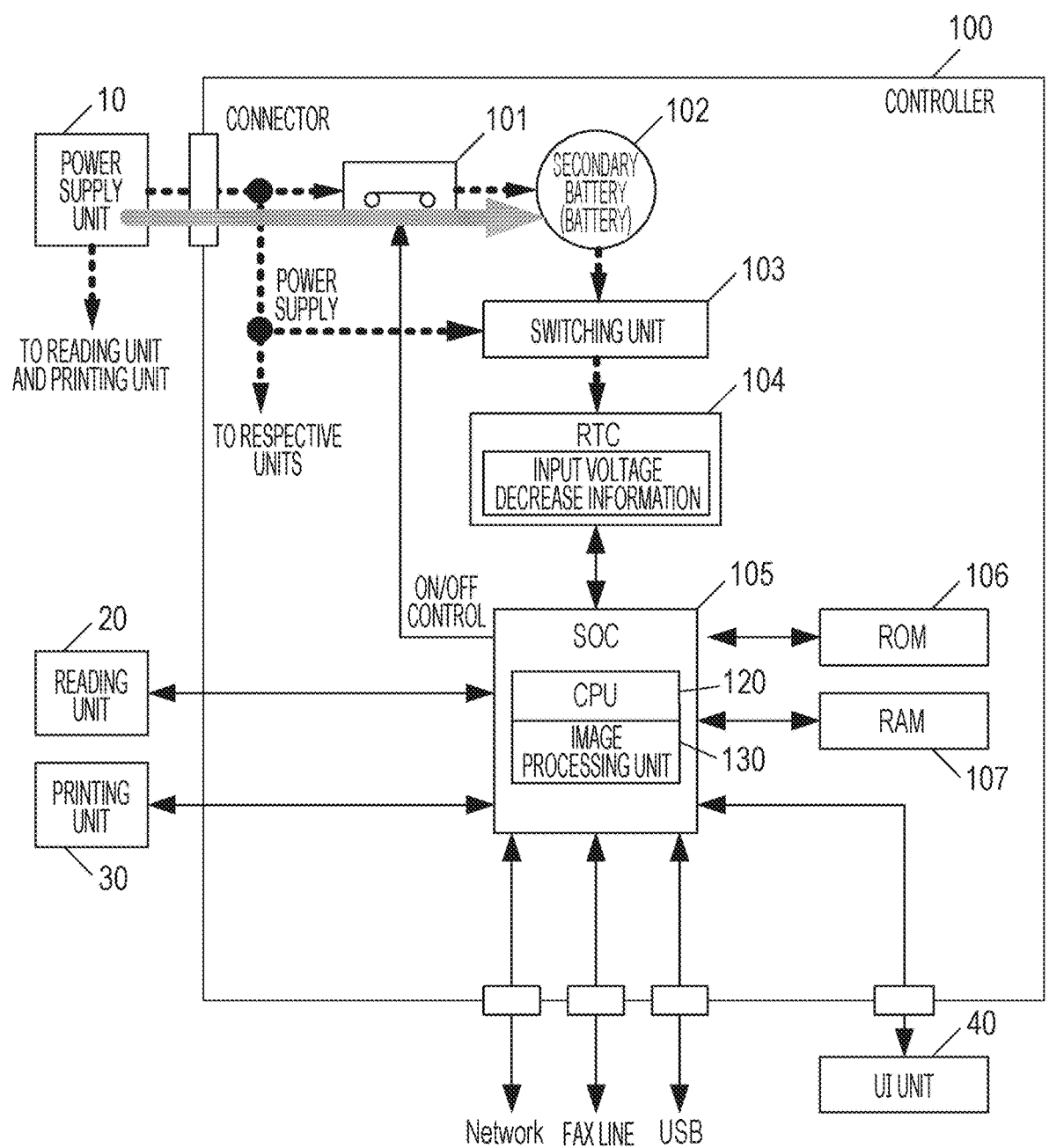
FIG. 2A is a schematic diagram for describing an operation outline according to the exemplary embodiment of the present disclosure.
Figure 2B:
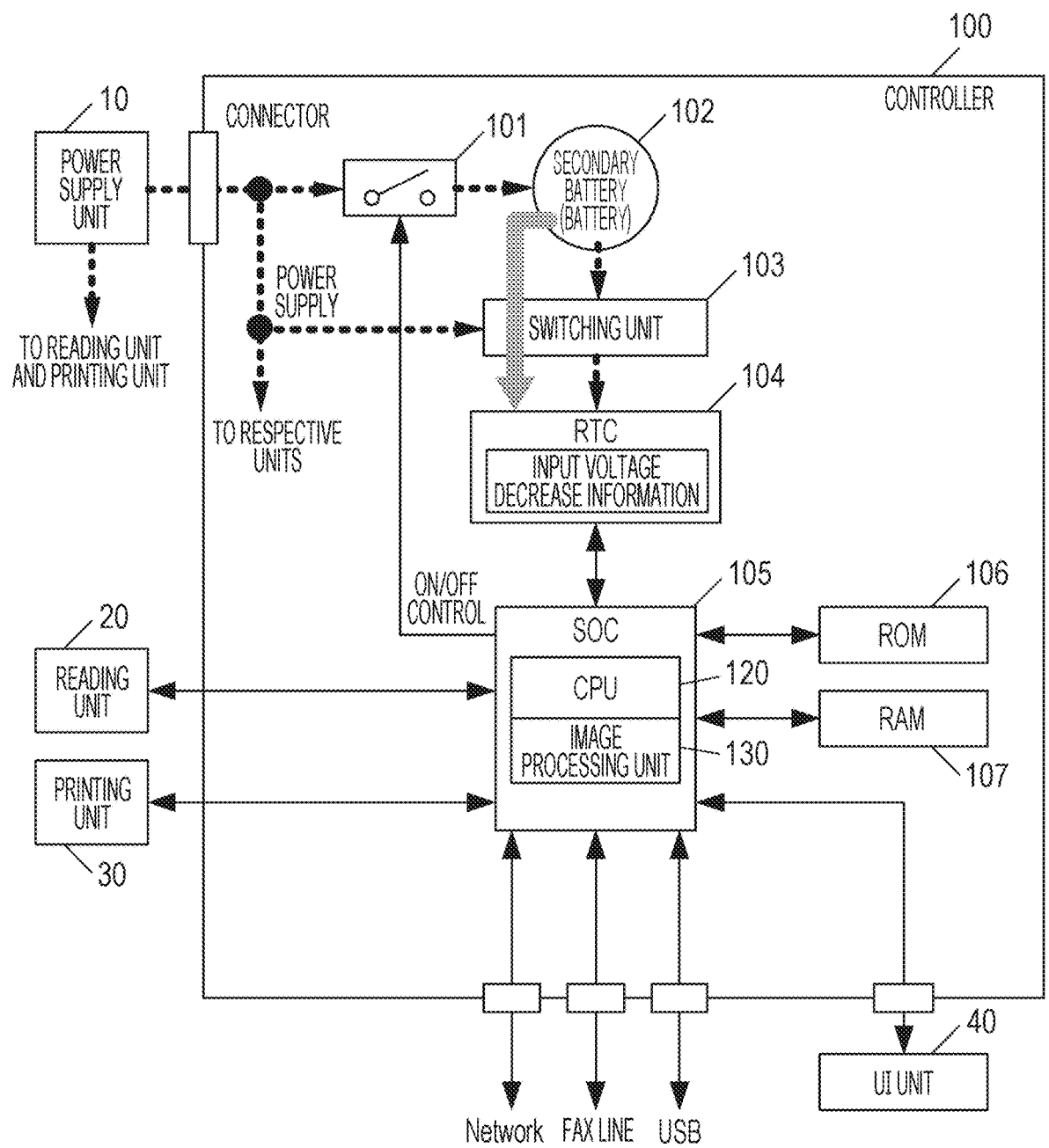
FIG. 2B is a schematic diagram for describing the operation overview according to the exemplary embodiment of the present disclosure.
Figure 2C:
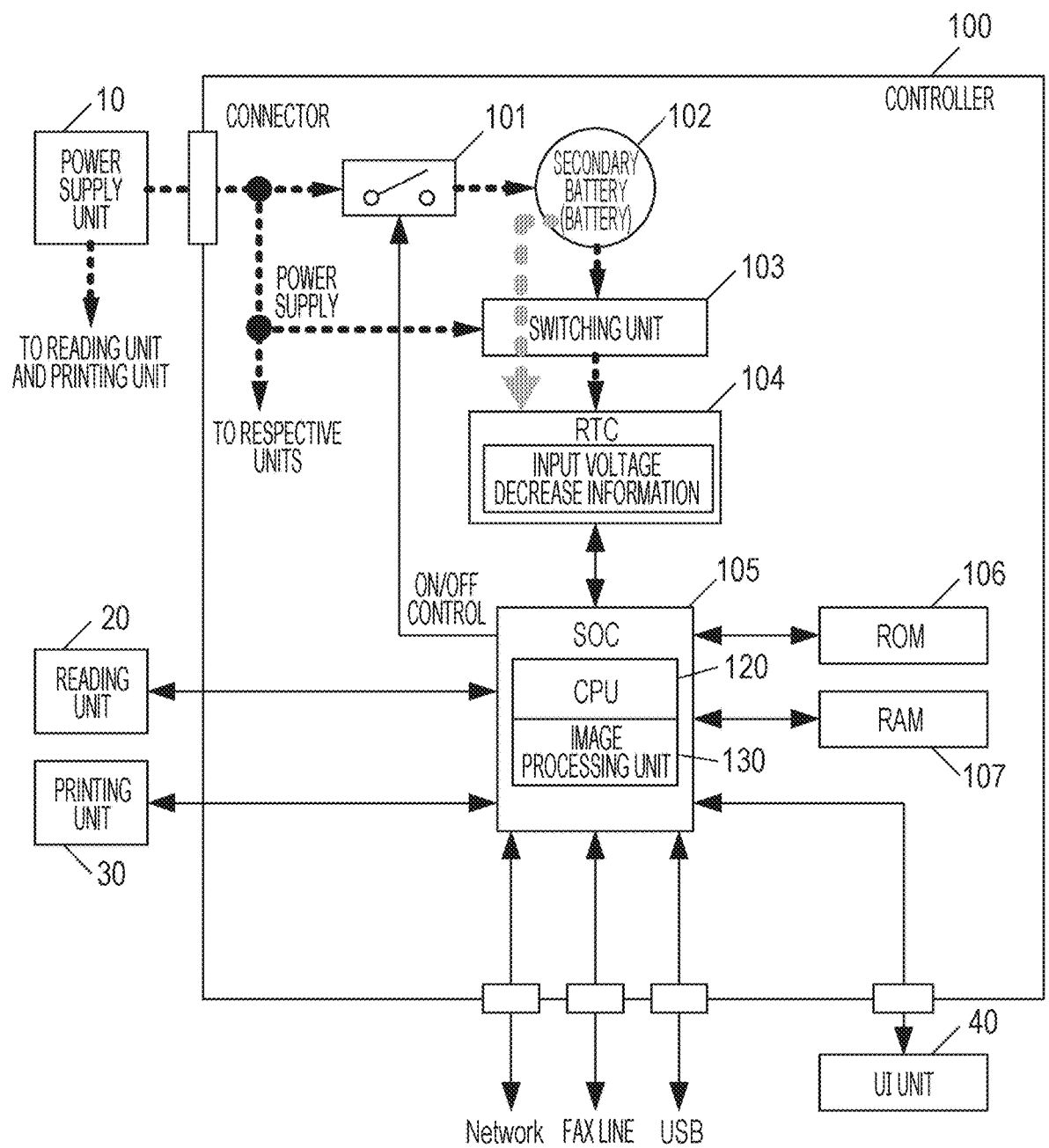
FIG. 2C is a schematic diagram for describing the operation overview according to the exemplary embodiment of the present disclosure.

FIGS. 2A to 2C are schematic diagrams for describing the operation outline according to the embodiment of the present disclosure.

As illustrated in FIG. 2A, in a power source ON state, the power is supplied from the power source unit 10 via a connector.

At this time, since the input voltage decrease information does not exist inside the RTC 104, the switch 101 enters the ON state, and the secondary battery 102 is charged.

The RTC 104 is also connected to the power source unit 10 by the switching unit 103 and supplied with the power.

Next, as illustrated in FIG. 2B, when a power source OFF state is established, the power supply from the power source unit 10 is stopped. In this situation, the switching unit 103 switches to the power supply from the secondary battery 102, and the RTC 104 is supplied with the power from the secondary battery 102 for backup.

Next, as illustrated in FIG. 2C, when the power source OFF state continues, a discharging state of the secondary battery 102 is established, and an input voltage of the RTC 104 is decreased to a predetermined threshold or below. The RTC 104 detects the input voltage decrease and also holds the input voltage decrease information. As a result of the input voltage decrease, the date and time information of the RTC 104 remains inaccurate or is set as an initial value.

Next, the control processing according to the first exemplary embodiment will be described with reference to FIG. 3.

Figure 3:
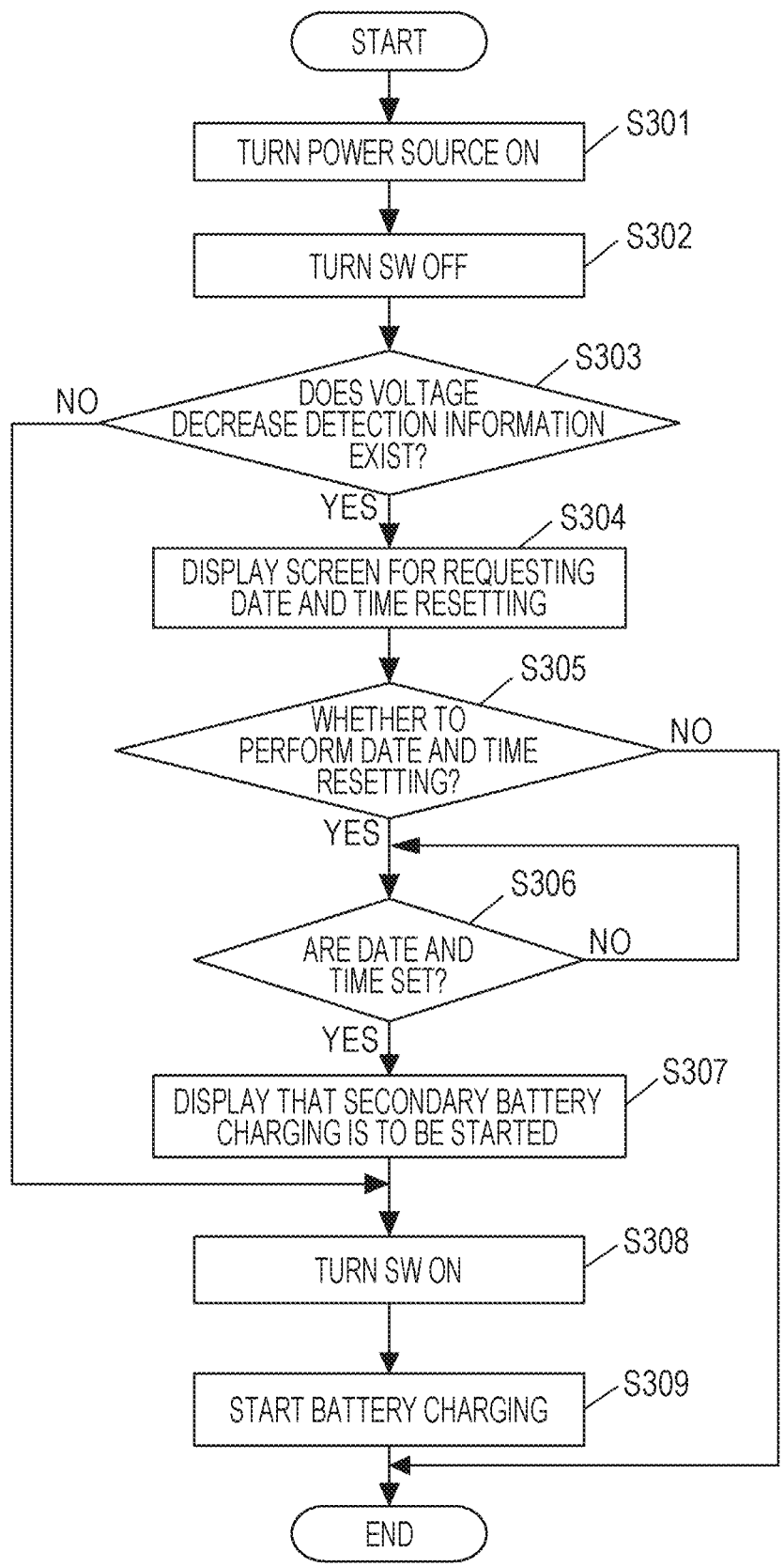
FIG. 3 is a flow chart for describing a control according to a first exemplary embodiment of the present disclosure.

FIG. 3 is a flow chart for describing the control according to the first exemplary embodiment of the present disclosure.

When the power source of the image forming apparatus turns on (S301), the CPU 120 turns the switch 101 off (S302). That is, the charging from the power source unit 10 to the secondary battery 102 is not performed.

Next, the CPU 120 enquires the RTC 104 whether or not the input voltage decrease information exists (S303). The SOC 105 is connected to the RTC 104 via a general-use communication interface such as, for example, an inter-integrated circuit ($I^2C$).

The CPU 120 can check whether or not the input voltage decrease information exists by reading out an internal status register of the RTC 104.

In addition, a notification may be made by inputting an interruption signal from the RTC 104 to the SOC 105.

In a case where the input voltage decrease information exists in the RTC 104 (S303: YES), the CPU 120 determines that the input voltage is decreased and displays a screen for requesting date and time resetting (FIG. 4A) on the UI unit 40 (S304).

In a case where the user selects that the resetting is to be performed (S305: YES), the CPU 120 displays a screen of the date and time resetting on the UI unit 40 (FIG. 4B), and the user performs the date and time resetting (S306: YES). Thereafter, the CPU 120 displays on the UI unit that the charging of the secondary battery is to be started (FIG. 4C) (S307), and the CPU 120 turns the switch 101 on (S308).

The switch 101 is constituted, for example, by a field effect transistor (FET) and performs control for switching ON or OFF at a High or Low level of a general-use signal (GPIO) from the SOC 105.

The charging from the power source unit 10 to the secondary battery 102 is started (S309), and the processing is ended.

In a case where the input voltage decrease information does not exist in the RTC 104 (S303: NO), the CPU 120 turns the switch 101 on (S308). Then, the charging from the power source unit 10 to the secondary battery 102 is started (S309), and the processing is ended.

On the other hand, in a case where the user selects that the resetting is not to be performed (S305: NO), the processing is ended. At this time, the switch 101 remains off, and the secondary battery is not charged.

FIGS. 4A to 4D illustrate a UI display according to an exemplary embodiment of the present disclosure.

Figure 4A:
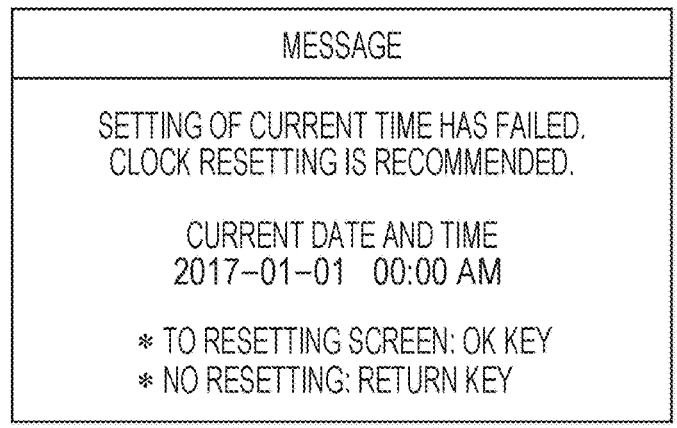
FIGS. 4A to 4D illustrate a UI display according to the exemplary embodiment of the present disclosure.

FIG. 4A illustrates a screen for requesting the date and time resetting.

Due to the decrease in the input voltage to the RTC 104, the date and time information held by the RTC 104 remains inaccurate or is set as the initial value, and the user is notified that the date and time resetting is needed.

Figure 4B:
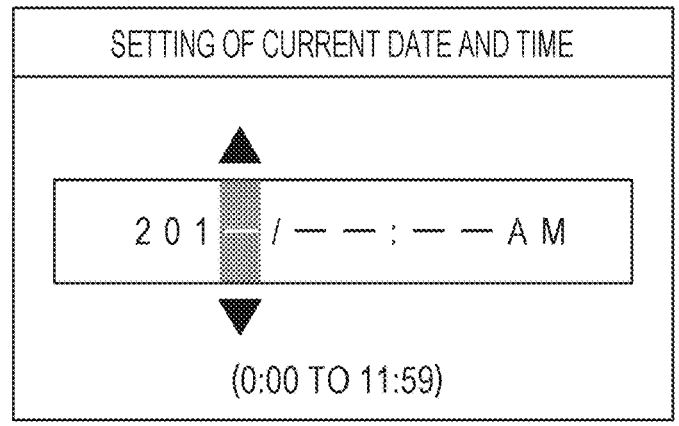

FIG. 4B illustrates a screen on which the user performs the date and time resetting.

Date and time setting is performed by an up and down key or a numeric keypad (which is not illustrated) of the UI unit 40.

Alternatively, the date and time information may be input by a short-range wireless communication from a device such as a smart phone.

Alternatively, the date and time information may be obtained from a time server on the internet via the network.

Figure 4C:
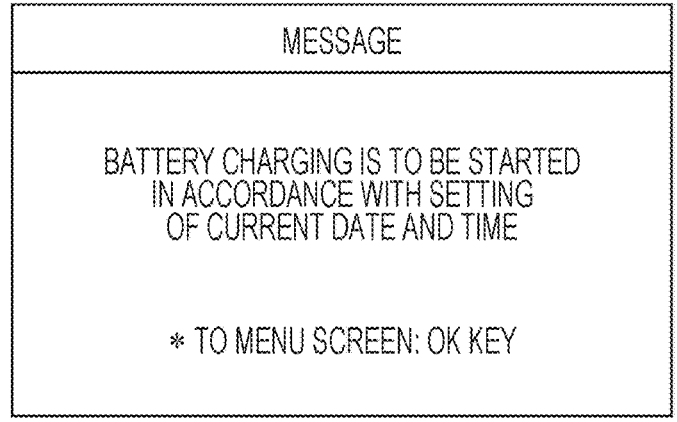
Figure 4D:
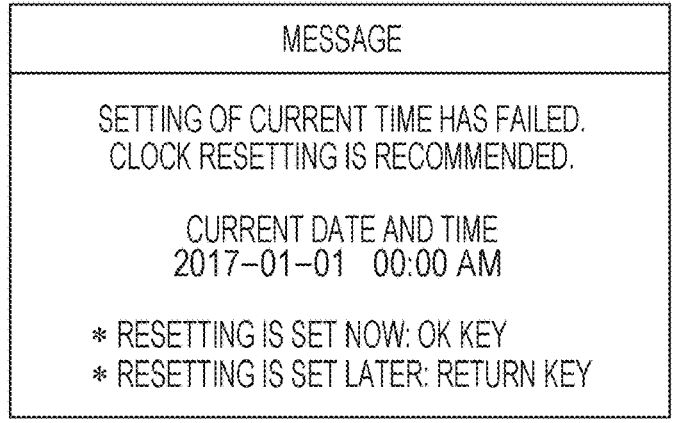

FIG. 4C illustrates a screen for notifying the user of the start of the charging to the secondary battery 102 after the user performs the date and time resetting.

A change in a charging and discharging cycle of the secondary battery 102 based on the above-described control will be described with reference to FIGS. 5A and 5B.

FIGS. 5A and 5B are schematic diagrams for describing the charging and discharging cycle of the secondary battery 102.

FIG. 5A illustrates a related art example.

After the power source is turned off, the secondary battery 102 is discharged, and the input voltage to the RTC 104 is decreased. When the input voltage becomes lower than or equal to an input voltage decrease threshold, the date and time information held by the RTC 104 remains inaccurate or is set as an initial value.

Thereafter, even when the power source is turned on, the secondary battery 102 is charged while the date and time information held by the RTC 104 remains inaccurate or is kept as the initial value. Therefore, the date and time information held by the RTC 104 remains inaccurate or is kept as the initial value, the charging and discharging cycle of the secondary battery 102 is consumed.

FIG. 5B illustrates the exemplary embodiment of the present disclosure.

After the power source is turned off, the secondary battery 102 is discharged, and the input voltage to the RTC 104 is decreased. When the input voltage becomes lower than or equal to the input voltage decrease threshold, the date and time information held by the RTC 104 remains inaccurate or is set as the initial value.

Thereafter, even when the power source is turned on, in a case where the resetting of the date and time information held by the RTC 104 is not performed and the date and time information remains inaccurate or is kept as the initial value, the charging of the secondary battery 102 is not started. Then, even after the power source is turned off, the discharging is completed, and the voltage is not changed.

At the next turning-on occasion of the power source, after the date and time resetting by the user is performed, the charging of the secondary battery 102 is started.

Therefore, the date and time information remains inaccurate or is kept as the initial value, and the secondary battery is not charged. In this manner, the consumption of the wasteful charging cycle of the secondary battery 102 is avoided.

As described above, in a case where the secondary battery is discharged, when the charging is started in accordance with the instruction by the user, it is possible to avoid the degradation caused by the charging and discharging cycle of the secondary battery.

Second Exemplary Embodiment

A second exemplary embodiment is different from the first exemplary embodiment in terms of corresponding control in a case where the user performs the date and time resetting via the UI unit 40. Specifically, the date and time resetting is requested in a case where the user performs an operation within a certain time or when the image forming apparatus returns from a standby state after no operation is performed to enter the standby state.

Part of descriptions which are the same as those according to the first exemplary embodiment will be omitted.

FIG. 6 is a flow chart for describing the control according to the second exemplary embodiment of the present disclosure.

The same parts as those according to the first exemplary embodiment of FIG. 3 are assigned with the same reference numerals, and part of the descriptions thereof will be omitted.

When the power source of the image forming apparatus turns on (S601), the CPU 120 turns the switch 101 off (S602). That is, the charging from the power source unit 10 to the secondary battery 102 is not performed.

Next, the CPU 120 enquires the RTC 104 whether or not the input voltage decrease information exists (S603).

In a case where the input voltage decrease information exists in the RTC 104 (S603: YES), the CPU 120 determines that the input voltage is decreased and displays a screen for requesting the date and time resetting on the UI unit 40, for example (FIG. 4D) (S604).

The user selects whether the date and time resetting is to be set now or is to be set later (S605).

In a case where the option "set now" is selected, when the user performs the date and time resetting via the UI unit 40 (FIG. 4B) (S606: YES), the CPU 120 displays that the charging of the secondary battery is to be started on the UI unit (FIG. 4C), and a date and time unset flag is set as '0' (S607).

The date and time unset flag is held in the register inside the SOC 105, for example.

Next, the CPU 120 turns the switch 101 on (S608).

The charging from the power source unit 10 to the secondary battery 102 is then started (S609).

On the other hand, in a case where the user selects the option "set later" for the date and time resetting (S605), the CPU 120 sets the date and time unset flag as '1' (S610).

Next, the CPU 120 activates a timer that is not illustrated in the drawing and starts measurement of a previously determined certain time (S611).

Herein, the previously determined certain time is set in the register inside the SOC 105. A configuration may also be adopted in which the setting time can be changed by counting the date and time unset flag.

In a case where no operation is performed for the certain time (S612: YES), the CPU 120 shifts the image forming apparatus to enter the standby state (S613).

In a case where the image forming apparatus returns from the standby state due to a reception of printing data, a returning request via the UI unit 40, or the like (S614: YES), the CPU 120 displays a screen for requesting the date and time resetting on the UI unit 40, for example (S604).

During this period, since the switch 101 remains off, the charging to the secondary battery 102 is not performed, and the time of the RTC 104 remains inaccurate.

On the other hand, in a case where the operation is performed within the certain time (S612: NO), the CPU 120 also displays a screen for requesting the date and time resetting on the UI unit 40, for example (FIG. 4D) (S604).

In a case where the input voltage decrease information does not exist in the RTC 104 (S603: NO), the CPU 120 turns the switch 101 on (S608).

The charging from the power source unit 10 to the secondary battery 102 is then started (S609).

In the above-described processing, in a case where the secondary battery is discharged or a case where the instruction by the user is not immediately performed, the charging is also started after the event for urging the user to issue the instruction is performed multiple times. In a case where the user does not correct the time, since the charging of the secondary battery is not performed, the charging cycle life is not consumed, and it is possible to avoid the degradation of the secondary battery.

Other Exemplary Embodiments

Various embodiments of the present disclosure can also be realized by the following processing in which a program for realizing one or more functions according to the above-described exemplary embodiments is supplied to a system or an apparatus via a network or a storage medium, one or more processors in a computer of the system or the apparatus read out the program to be executed. Various embodiments of the present disclosure can also be realized by a circuit that realizes one or more functions (for example, an application specific integrated circuit (ASIC)).

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No, 2017-173350 filed Sep. 8, 2017, which is hereby incorporated by reference herein in its entirety.

What is claimed is:

1. An information processing apparatus comprising:
a real-time clock (RTC);
a battery that supplies charged power to the RTC;
a power supply unit configured to supply power to the battery;
a display control unit configured to display a screen for setting date and time of the RTC on a display, on the basis of voltage of the battery; and
a control unit configured to perform control so that the battery that supplies charged power to the RTC is to be charged by power supplied from the power supply unit, on the basis of the setting of the date and time of the RTC via the screen by a user, wherein the battery is not charged before the date and time of the RTC are set via the screen by a user.

2. The information processing apparatus according to claim 1, further comprising:
a switch arranged between the power supply unit and the battery,
wherein the control unit turns on the switch on the basis of the setting of the date and time of the RTC via the screen by a user.

3. The information processing apparatus according to claim 2, wherein the control unit turns off the switch at a time of activation of the information processing apparatus, and thereafter turns on the switch on the basis of the setting of the date and time of the RTC via the screen by a user.

4. The information processing apparatus according to claim 1, further comprising a switching unit configured to switch a power supply to the RTC to the battery or the power supply unit.

5. The information processing apparatus according to claim 1, wherein the display displays that the charging of the battery is to be started, on the basis of the setting of the date and time of the RTC via the screen by a user.

6. The information processing apparatus according to claim 1, wherein the display displays a screen for selecting whether or not the date and time of the RTC is to be set.

7. The information processing apparatus according to claim 1, wherein the display displays a screen including an option for a user to select whether the date and time of the RTC is to be set now or is to be set later.

8. The information processing apparatus according to claim 7, wherein, in a case where the user selects the option to set the date and time of the RTC at a later time, the display displays a screen for the setting of the date and time of the RTC on the display in accordance with a time that has elapsed since the user selected the option to set the date and time of the RTC at a later time.

9. The information processing apparatus according to claim 1, further comprising:
a storage unit configured to store information related to the voltage of the battery,
wherein the display displays the screen for the setting of the date and time of the RTC on the display, on a basis of the information stored in the storage unit.

10. The information processing apparatus according to claim 1, further comprising a printing unit configured to print an image on a recording medium.

11. The information processing apparatus according to claim 1, further comprising a reading unit configured to read an image on a document.

12. A charging method for a battery provided in an information processing apparatus, the battery supplying power to a real-time clock (RTC), and the charging method comprising:
displaying, on a display, a screen for setting date and time of the RTC, on the basis of voltage of the battery; and
charging the battery that supplies charged power to the RTC, on the basis of the setting of the date and time of the RTC via the screen by a user, wherein the battery is not charged before the date and time of the RTC are set via the screen by a user.

13. The charging method for the battery according to claim 12, wherein the battery is charged by turning on a switch arranged between a power supply unit and the battery.

14. The charging method for the battery according to claim 13, further comprising turning off the switch at a time of activation of the information processing apparatus.

15. The charging method for the battery according to claim 12, further comprising switching a power supply to the RTC to the battery or a power supply unit.

16. The charging method for the battery according to claim 12, further comprising displaying that the charging of the battery is to be started, on the basis of the setting of the date and time of the RTC via the screen by a user.

17. The charging method for the battery according to claim 12, further comprising displaying a screen for selecting whether or not the date and time of the RTC are to be set.

18. The charging method for the battery according to claim 12, further comprising:
   storing information related to the voltage of the battery,
   wherein the displaying, on the display, of the screen for the setting of the date and time of the RTC is performed on a basis of the stored information.

19. The charging method for the battery according to claim 12, further comprising printing an image on a recording medium.

20. The charging method for the battery according to claim 12, further comprising reading an image on a document.

* * * * *